(12) United States Patent
Ben-Alexander

(10) Patent No.: US 8,718,615 B2
(45) Date of Patent: May 6, 2014

(54) QUEUE MANAGEMENT

(76) Inventor: Eran Ben-Alexander, Ramat Gan (IL)

( * ) Notice: Subject to any disclaimer, the term of this patent is extended or adjusted under 35 U.S.C. 154(b) by 0 days.

(21) Appl. No.: 13/591,262

(22) Filed: Aug. 22, 2012

(65) Prior Publication Data

US 2012/0315868 A1    Dec. 13, 2012

Related U.S. Application Data

(63) Continuation-in-part of application No. PCT/IB2011/050861, filed on Mar. 1, 2011.

(60) Provisional application No. 61/309,496, filed on Mar. 2, 2010.

(51) Int. Cl.
    *H04M 3/00*    (2006.01)
(52) U.S. Cl.
    USPC .......................................... 455/414.1; 705/5
(58) Field of Classification Search
    USPC .............................. 455/414.1; 705/5; 709/203
    See application file for complete search history.

(56) References Cited

U.S. PATENT DOCUMENTS

| | | | |
|---|---|---|---|
| 5,502,806 A * | 3/1996 | Mahoney et al. ............. | 715/839 |
| 6,173,209 B1 * | 1/2001 | Laval et al. ..................... | 700/91 |
| 2002/0116235 A1 * | 8/2002 | Grimm et al. .................... | 705/5 |
| 2003/0093167 A1 * | 5/2003 | Sim ................................. | 700/90 |
| 2006/0273920 A1 * | 12/2006 | Doan et al. ............... | 340/825.29 |
| 2007/0244731 A1 * | 10/2007 | Barhydt et al. ................... | 705/5 |
| 2007/0286220 A1 * | 12/2007 | Stenning ...................... | 370/412 |
| 2008/0133283 A1 * | 6/2008 | Backer et al. .................... | 705/5 |
| 2009/0063205 A1 * | 3/2009 | Shibasaki ........................ | 705/5 |
| 2009/0112638 A1 * | 4/2009 | Kneller et al. .................... | 705/5 |
| 2009/0204449 A1 * | 8/2009 | Waytena et al. .................. | 705/5 |
| 2009/0313062 A1 * | 12/2009 | Natsuyama et al. ............. | 705/7 |
| 2009/0319306 A1 * | 12/2009 | Chanick ........................... | 705/5 |
| 2009/0323909 A1 * | 12/2009 | Timmins ................... | 379/88.16 |
| 2010/0312619 A1 * | 12/2010 | Ala-Pietila et al. ......... | 705/14.1 |
| 2011/0307547 A1 * | 12/2011 | Backer et al. ................ | 709/203 |

* cited by examiner

*Primary Examiner* — Nathan Taylor
(74) *Attorney, Agent, or Firm* — The Law Office of Joseph L. Felber

(57) ABSTRACT

Disclosed are methods and devices for queue management that allow a person waiting in the queue to choose to receive at least one warning communication, for example on a wireless communication device such as a cellular telephone. In some embodiments, the person agrees to "buy" the warnings and concomitant free time by agreeing to pay for at least one warning communication and/or by agreeing to accept advertisements.

23 Claims, 7 Drawing Sheets

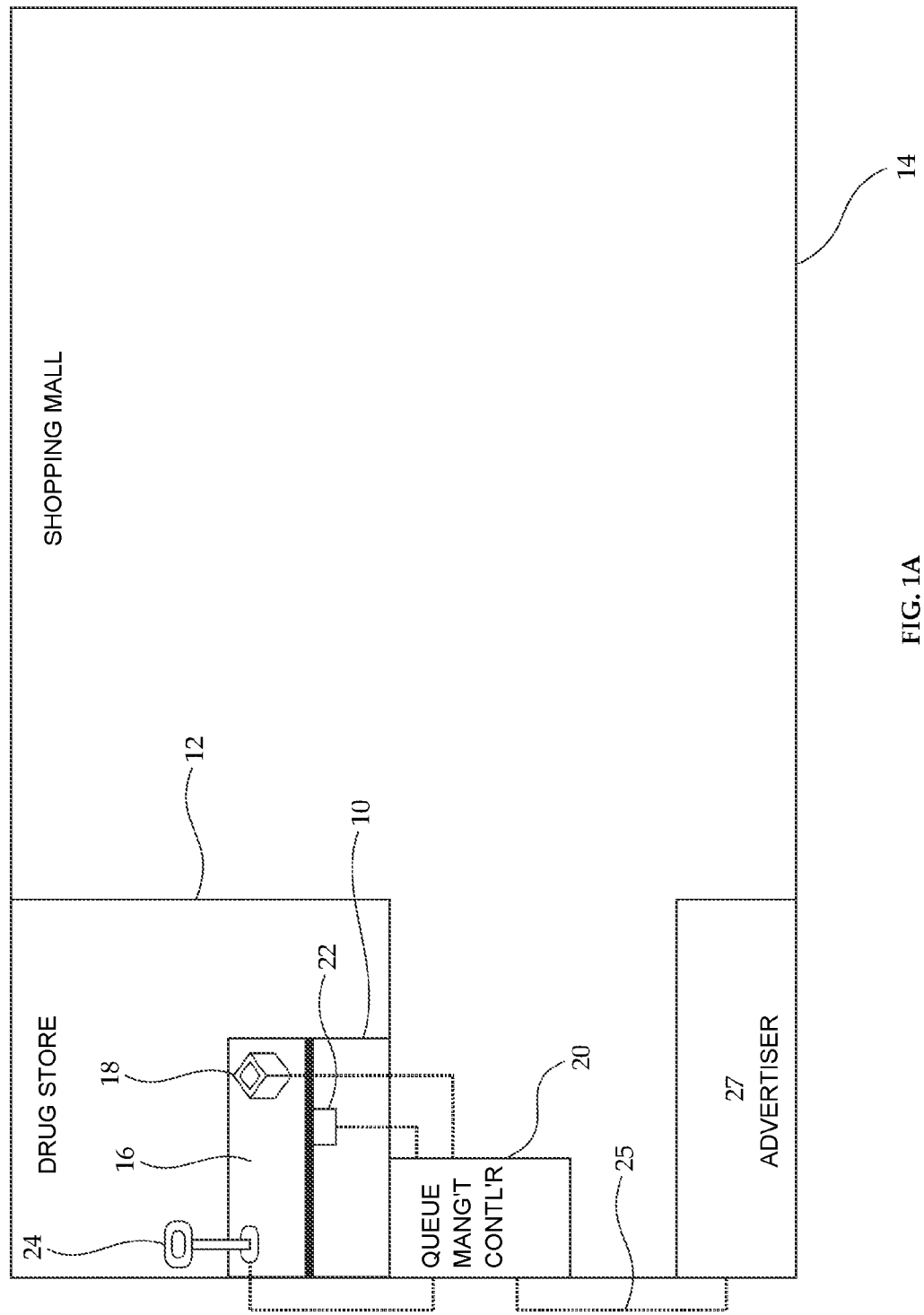

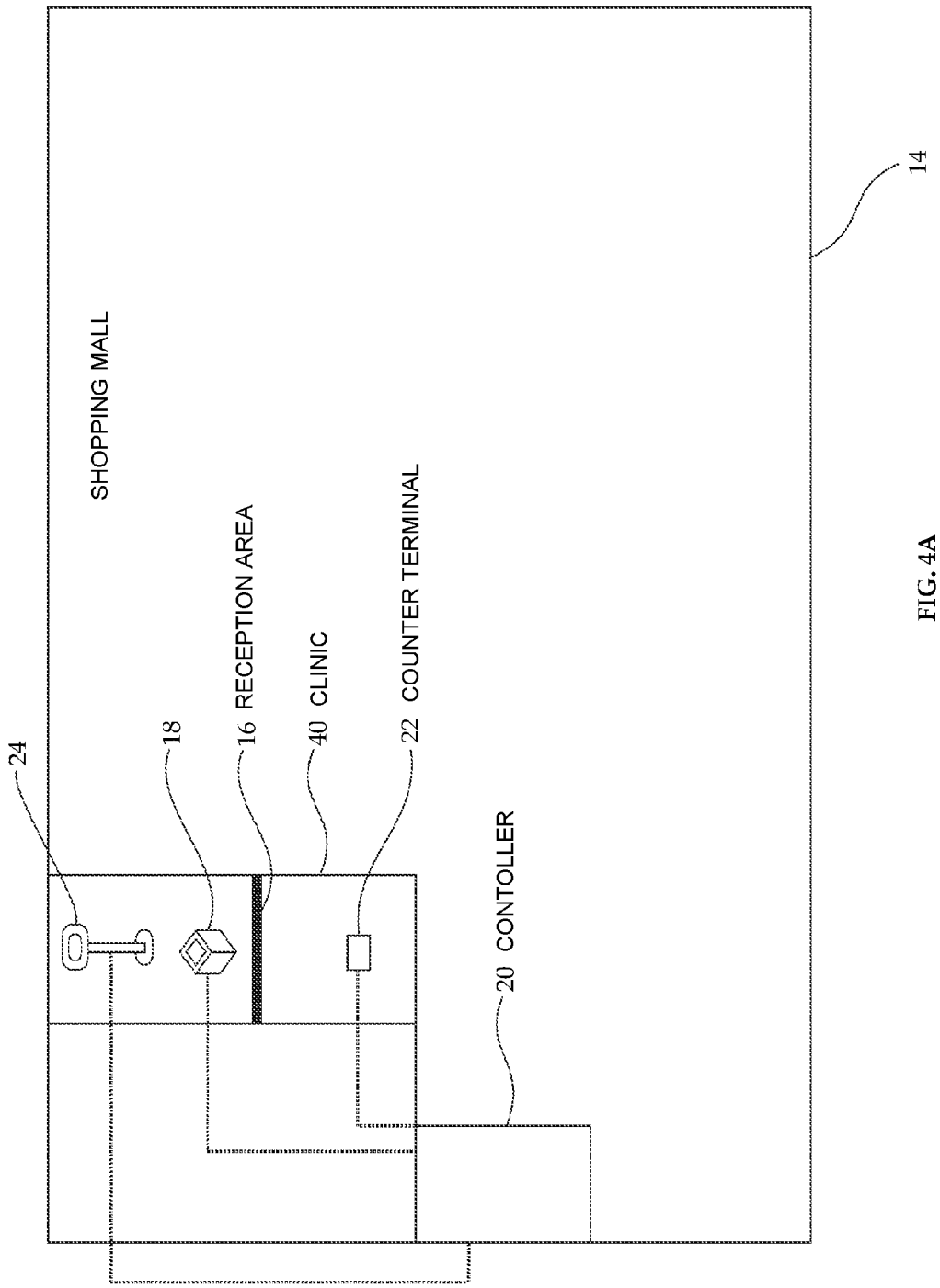

QUEUE MANAGEMENT

RELATED APPLICATION

The present application is a Continuation in Part of PCT/IB2011/050861 having an International Filing Date of 1 Mar. 2011 and also gains priority from U.S. Provisional Patent Application No. 61/309,496 filed 2 Mar. 2010, which is included by reference as if fully set forth herein.

FIELD AND BACKGROUND OF THE INVENTION

The invention, in some embodiments, relates to the field of queue management, and more particularly, but not exclusively, to methods and devices for queue management that in some aspects are superior to those known in the art. The invention, in some embodiments, relates to the field of advertisement, and more particularly, but not exclusively, to methods and devices for focused advertisement that in some aspects are superior to those known in the art.

In many situations, a demand for a service is greater than the ability to supply the service, for example to receive a prescription in a pharmacy or to load/unload a truck at a depot or terminal. As a result, people requiring the service are forced to wait for a long period of time in a queue. Typically, to increase physical comfort, a person joining a queue is assigned a turn in the queue and given a turn-ticket on which the assigned turn is designated, e.g., printed on a piece of paper. A succeeding turn is announced every time a service provider is available and the person holding the turn-ticket with the announced turn is provided with the service.

Waiting in a queue is a waste of time and money. Instead of doing something useful or pleasurable during the wait in a queue, a person in the queue must wait patiently in a reception area and follow the progression of the queue. A person can decide to leave the reception area, but risks losing their turn if they are not physically present when their turn announced.

It has been suggested to allow people to order a turn in a queue from a remote location, for example from home. In some cases, a person orders a specific time to be served or is assigned a specific time that is expected to be available. Such methods can be inefficient as there is no guarantee that a person will actually come for the service. Further, usually the person arrives at the specific assigned time and still must wait for a period of time before being served.

SUMMARY OF THE INVENTION

Some embodiments of the invention relate to methods and devices for queue management that in some aspects have advantages over known methods and devices for queue management.

Disclosed are methods and devices for queue management that allow a person waiting in the queue to choose to receive at least one warning communication, for example on a wireless communication device such as a cellular telephone. In some embodiments, the person agrees to "buy" the warning communications and concomitant free time by agreeing to pay for at least one warning communication and/or by agreeing to accept advertisements.

According to an aspect of some embodiments of the invention there is provided, a method for queue management for a service provided at a service location, comprising:

a. positioning at least one turn-distributing terminal at a waiting area;

b. upon request by a person for a turn from a turn-distributing terminal, assigning the person a turn in a queue, and in some embodiments providing the person with a turn-ticket designating the turn;

c. offering the person an option of receiving at least one warning communication warning of the approach of the turn;

d. subsequent to c, if the person accepts the offer, accepting a communication route of the person in the waiting area; and e. prior to the turn, transmitting to the person at least one warning communication.

In some embodiments, the turn-distributing terminal comprises a queue management kiosk physically located at the waiting area, and the request by a person comprises the person interacting with a user-interface of the queue management kiosk, such as by pressing a button on the queue management kiosk or by interacting with a graphic user-interface of the queue management kiosk.

In some embodiments, the turn-distributing terminal comprises a biometric queue management kiosk physically located at the waiting area, and the request by a person comprises the person providing biometric identification information to the biometric queue management kiosk, such as by placing a finger on a fingerprint scanner of the biometric queue management kiosk, or by allowing his or her eye to be scanned by an iris scanner of the biometric queue management kiosk.

In some embodiments, the turn-distributing terminal comprises a queue management Wi-Fi access point, and the request by a person comprises the person using a wireless communication device, such as a suitably equipped mobile telephone, laptop computer, or tablet computer, while physically located in the waiting area to connect to the queue management Wi-Fi access point. In some such embodiments, the queue management Wi-Fi access point comprises a dedicated Wi-Fi access point.

In some embodiments, the turn-distributing terminal comprises a queue management Bluetooth® transceiver, and the request by a person comprises the person using a wireless communication device, such as a suitably equipped mobile telephone, laptop computer, or tablet computer, while physically located in the waiting area, to connect to the queue management Bluetooth® transceiver. In some such embodiments, the queue management Bluetooth® transceiver comprises a dedicated Bluetooth® transceiver.

In some embodiments, the turn-distributing terminal is configured to obtain positioning information. In some such embodiments, the request by the person comprises the person accessing an application running on a mobile communication device, such as a suitably equipped mobile telephone. Following receipt of the request, assigning the turn in the queue comprises the turn-distributing terminal obtaining positioning information for the mobile communication device, and assigning the person a turn in the queue only if the person is located in or near the waiting area, as indicated by the positioning information.

In some embodiments, the positioning information comprises Global Navigation Satellite System (GNSS) information (e.g. GPS, GLONAS). In some embodiments, the positioning information comprises information obtained from a mobile communication center regarding a wireless relay point for mobile communication (e.g. cellular telephony antenna) currently being accessed by the mobile communication device used by the person.

In some embodiments, transmitting of at least one warning communication is contingent on receipt of an agreement to pay for at least one warning communication.

In some embodiments, accepting the communication route of the person is through the turn-distributing terminal. In some embodiments, the communication route is a contact number of a mobile communication device. In some embodiments, the communication route is an email address accessible by a mobile communication device. In some embodiments, the communication route is an instant messaging and/or chat username accessible by a mobile communication device.

In some embodiments, transmitting of at least one warning communication is contingent on receipt of a valid response to a confirmation communication transmitted through the communication route. In some embodiments, transmitting of the at least one warning communication is contingent on receipt of a response to the confirmation communication through the turn-distributing terminal.

In some embodiments, the method further comprises, accepting a desired number of warning communications from the person, that is to say the number of warning communications the person would like transmitted.

In some embodiments, at least one warning communication is transmitted to the communication route.

In some embodiments, the method further comprises, subsequent to accepting the communication route, sending the person an advertisement.

In some embodiments, the sending of an advertisement is contingent on receipt of consent therefor.

In some embodiments, the transmitting of the at least one warning communication is contingent on the person's agreement to receive an advertisement.

In some embodiments, the advertisement is sent through the communication route.

In some embodiments, the advertisement is for a service available in proximity of the waiting area.

In some embodiments, the advertisement is for a service available in proximity of a route between the turn-distributing terminal and the service location.

In some embodiments, the nature of the advertisement is related to a waiting time for the turn, e.g., the advertisement is selected according to an estimated waiting time for the turn.

In some embodiments, the nature of the advertisement is related to the nature of the service provided at the service location, e.g., the advertisement is selected according to the type of service provided at the service location, for example, for which the person is waiting in the queue.

In some embodiments, the nature of the advertisement is related to the nature of the person, e.g., the advertisement is selected according to at least one (known or expected) characteristic of the person.

In some embodiments, the nature of the advertisement is related to a choice made by the person, e.g., the advertisement is selected according to a choice made by the person.

In some embodiments, the nature of the advertisement is related to the communication route accepted from the person, e.g., the advertisement is different if the communication route comprises email communication or a mobile telephone number.

According to an aspect of some embodiments of the invention there is also provided, a queue management device configured to manage a queue, comprising a controller functionally associated with at least one turn-distributing terminal, together configured to:

a. assign a turn in a queue to a person requesting such (and in some embodiments, also providing a turn-ticket designating the assigned turn to the person); and b. accepting a communication route from the person and storing the communication route in association with the assigned turn in the queue;

wherein the queue management device is functionally associated with a communications component, and c. prior to the turn of the person, transmitting a warning communication to the person using the communications component.

In some embodiments, the turn-distributing terminal comprises a queue management kiosk physically located at the waiting area, and the request by a person comprises the person interacting with a user interface of the queue management kiosk, such as by pressing a button on the queue management kiosk or by interacting with a graphic user-interface of the queue management kiosk.

In some embodiments, the turn-distributing terminal comprises a biometric queue management kiosk physically located at the waiting area, and the request by a person comprises the person providing biometric identification information to the biometric queue management kiosk, such as by placing a finger on a fingerprint scanner of the biometric queue management kiosk, or by allowing his or her eye to be scanned by an iris scanner of the biometric queue management kiosk.

In some embodiments, the turn-distributing terminal comprises a queue management Wi-Fi access point, and the request by a person comprises the person using a wireless communication device, such as a suitably equipped mobile telephone, laptop computer, or tablet computer, while physically located in the waiting area to connect to the queue management Wi-Fi access point. In some such embodiments, the queue management Wi-Fi access point comprises a dedicated Wi-Fi access point.

In some embodiments, the turn-distributing terminal comprises a queue management Bluetooth® transceiver, and the request by a person comprises the person using a wireless communication device, such as a suitably equipped mobile telephone, laptop computer, or tablet computer, while physically located in the waiting area to connect to the queue management Bluetooth® transceiver. In some such embodiments, the queue management Bluetooth® transceiver comprises a dedicated Bluetooth® transceiver.

In some embodiments a communication component is the Internet, together with a suitable website and associated hardware and software that allows transmission of communications to a mobile communication device of a person such as a cellular telephone.

In some embodiments, the turn-distributing terminal is configured for positioning in a waiting area of a service location.

In some embodiments, the device is configured that the accepting of a communication route is through a turn-distributing terminal. In some embodiments, the communication route is a contact number of a mobile communication device. In some embodiments, the communication route is an email address accessible by a mobile communication device. In some embodiments, the communication route is an instant messaging and/or chat username accessible by a mobile communication device.

In some embodiments, the device is configured that the providing of a turn-ticket is through a turn-distributing terminal. In some embodiments, the turn-ticket comprises a turn-ticket printed on paper. In some embodiments, the turn-ticket comprises a mobile communication indicative of the turn information, such as a short text message or electronic mail message.

In some embodiments, the device further comprises a payment-accepting component, for example the required component (hardware, software and communications) to accept payment with cash, credit cards, debit cards, and the like.

In some embodiments, the device is further configured to transmit a warning communication to a stored communication route of a person using the communication component.

In some embodiments, the device is further configured to transmit a confirmation communication to a stored communication route of a person using the communication component.

In some embodiments, the device is further configured to receive a response to a transmitted confirmation communication through a turn-distributing terminal.

In some embodiments, the device is further configured to send an advertisement to a stored communication route of a person using the communication component. In some embodiments, the device further comprises a collection of different advertisements, and is configured to select an advertisement from the collection of different advertisements based on a characteristic of the advertisement and to send the selected advertisement.

In some embodiments, the device is configured to calculate a queue waiting time, and the selection of an advertisement from the collection of different advertisements is based on the queue waiting time.

Unless otherwise defined, all technical and scientific terms used herein have the same meaning as commonly understood by one of ordinary skill in the art to which the invention pertains. In case of conflict, the specification, including definitions, will control.

As used herein, by communicating with a Wi-Fi access point is meant that a suitably-configured device establishes a Wi-Fi session (e.g., as known in the art) in order to send and receive communications.

As used herein, by communicating with a Bluetooth® transceiver is meant that a suitably-configured device joins and participates in a Bluetooth® piconet (e.g., as known in the art) in order to send and receive communications.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

Embodiments of methods and/or devices of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general purpose computers. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results).

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures:

FIG. 1A is a schematic depiction of a service location that is a pharmacy in a drug store located in a shopping mall;

FIG. 4A is a schematic depiction of a service location that is a medical clinic located in a shopping mall.

DESCRIPTION OF SOME EMBODIMENTS OF THE INVENTION

Figure 1B:
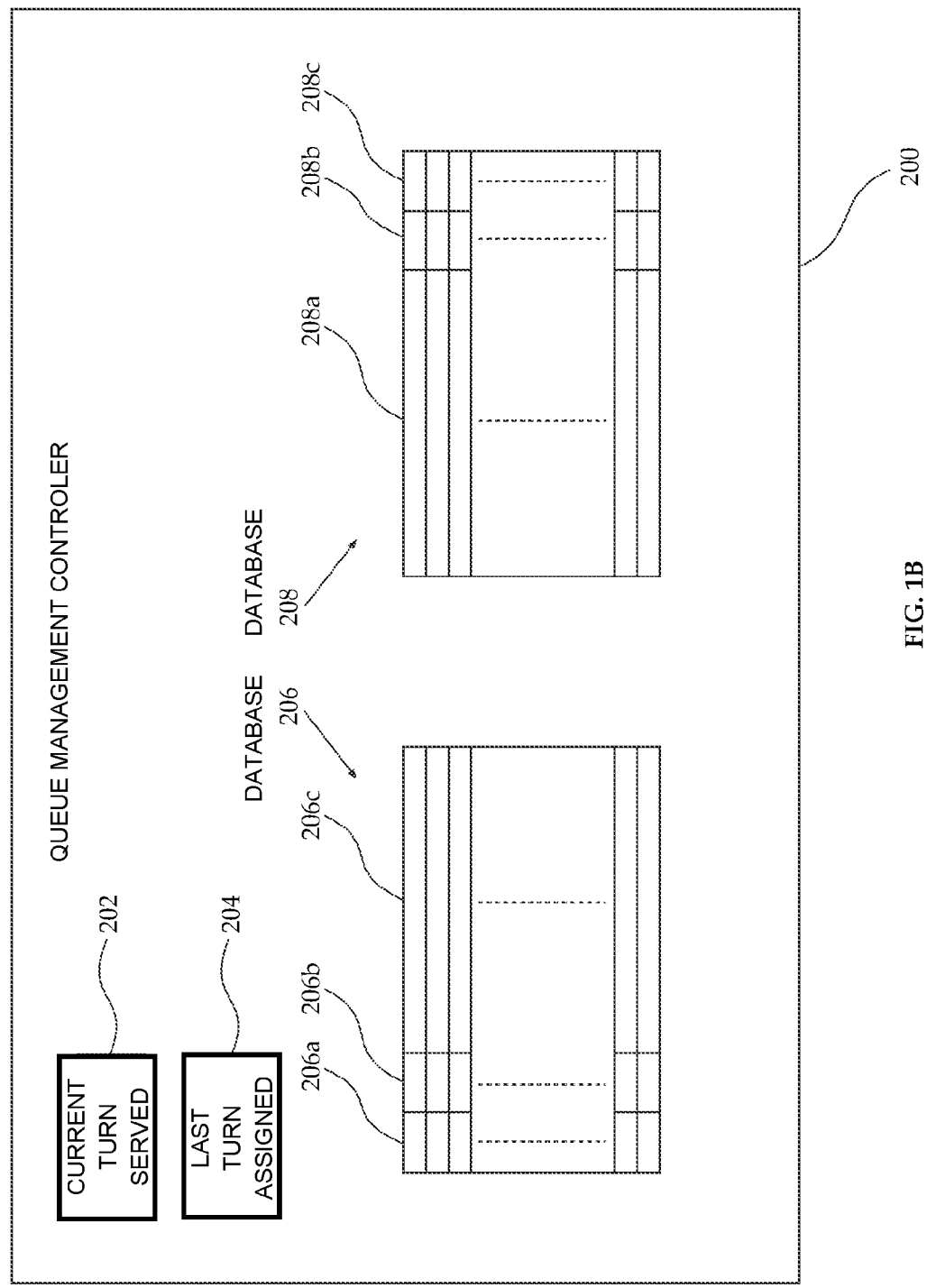
FIG. 1B is a schematic depiction of an embodiment of a queue management controller used in implementing an embodiment of the queue management method described herein.

The invention, in some embodiments thereof, relates to methods and devices for queue management, that in some embodiments allow focused advertisement.

The principles, uses and implementations of the teachings herein may be better understood with reference to the accompanying description and figures. Upon perusal of the description and figures present herein, one skilled in the art is able to implement the invention without undue effort or experimentation. In the figures, like reference numerals refer to like parts throughout.

Before explaining at least one embodiment, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

As noted above, in some instances when demand for a service is greater than the ability to supply the service, persons interested in the service must wait in a queue. Generally a person joining a queue is assigned a turn in the queue typically designated by a number appearing on a turn-ticket.

As other people are served in order of their turn, the person's place in the queue advances until it is their turn to receive the service.

Generally, the person waits in a specified reception area where the progression of the queue is reported. If a person leaves the reception area and their turn arrives when they are not present, the turn is lost. As a result, to ensure that that their turn is not lost, a person is forced to waste a significant amount of time in a reception area in order to follow the progression of the queue.

A person can choose to risk losing the assigned turn and leave the reception area to do something else, planning to come back in time for the turn. Since the person has no idea how much free time they have before it is their turn, such a person often become irritable and nervous at the prospect of losing their turn. As a result, the person does not enjoy doing whatever they have chosen to do.

Some embodiments of the invention described herein, overcome or alleviate some of the problems of existing methods of queue management.

According to an aspect of some embodiments of the invention there is provided, a method for queue management for a service provided at a service location, comprising:
   a. positioning at least one turn-distributing terminal at a waiting area;
   b. upon request by a person for a turn from a turn-distributing terminal, assigning the person a turn in a queue, and in some embodiments providing the person with a turn-ticket designating the turn;
   c. offering the person an option of receiving at least one warning of the approach of the turn;
   d. subsequent to c, if the person accepts the offer, accepting a communication route of the person in the waiting area; and
   e. prior to the turn, transmitting to the person at least one warning communication.

By service is meant both service and acquisition of a product sold or provided at a physical service location (as opposed to virtual service locations, such as a telephone call center). Typical physical service locations include health clinics that provide health related services; pharmacies and drug stores that provide prescription drugs, for example by a pharmacist; telecommunication customer centers, repair and service centers; post offices; government and government offices (e.g., vehicle licensing bureaus, social security, immigration and naturalization offices); beauty parlours, hair dressing salons, cosmetic salons, massage parlours, manicurists, pedicurists, ticket-purchasing offices (e.g., as found in Times Square (New York, N.Y., USA) or Piccadilly Circus (London, England)) and the like; as well as cargo-container depots, depots, refineries, shipping terminals, ports, ocean and sea terminals, airports and air terminals, rail terminals, storehouses and the like. In some embodiments service locations include specific departments in department stores (generally departments where purchase of the item requires specialist advice, e.g., shoe-fitting departments, tailoring departments, bridal departments) and specific sections in supermarkets (generally sections where receipt of an item is by a supermarket employee, e.g., deli, meat section and cheese section).

According to some embodiments of the method described herein, a person who is interested in the service provided by a service location must access a turn-distributing terminal while being physically located at a waiting area which, as discussed in greater detail hereinbelow, is relatively close to the service location.

According to embodiments of the method as described herein, in some embodiments the turn-distributing terminal at which a person requests a turn is positioned at a waiting area. A waiting area is an area in proximity of the service location where it is desired that a person interested in the service waits for their turn in the queue to arrive. Positioning the turn-distributing terminal at a waiting area is an important aspect of some embodiments of the method described herein as it contributes to ensuring that the person is physically located at the waiting area, the importance of which is discussed hereinbelow.

In the art, turn-distributing terminals are often positioned in a reception area of a service location. In some embodiments of the method described herein, a turn-distributing terminal is positioned in a reception area of the service location, which is inside or in proximity of a waiting area.

In some embodiments, a turn-distributing terminals is positioned somewhere in a waiting area that is within a reachable distance of service location, that is to say, the turn-distributing terminal is located at a distance that the person can reach the service location in time upon receipt of warning communication. For example, a turn-distributing terminal for a pharmacy with an expected queue waiting time of at least five minutes is positioned at the entrance to a shopping mall where the pharmacy is located as a walking person can reach the pharmacy from anywhere in the mall within five minutes. For example, a turn-distributing terminal for a cargo container depot with an expected queue waiting time of at least one hour is positioned at a rest stop that is located no more than one hour drive from the cargo container depot.

In some embodiments, the turn-distributing terminal comprises a queue management kiosk physically located at the waiting area, and a person who is interested in the service provided by a service location must physically go to the queue management kiosk located at the waiting area in order to request a turn in the queue. In some such embodiments, the queue management kiosk comprises a biometric queue management kiosk.

In some embodiments, the turn-distributing terminal comprises a queue management Wi-Fi access point physically located at the waiting area, and a person who is interested in requesting a turn for the service provided by a service location must connect to the queue management Wi-Fi access point. In some such embodiments, due to the range limitations of Wi-Fi transmissions, the person is only be able to connect to the queue management Wi-Fi access point to request a turn when the person is in physical proximity to the queue management Wi-Fi access point, and therefore physically located at the waiting area.

In some embodiments, the turn-distributing terminal comprises a queue management Bluetooth® transceiver located at the waiting area, and a person who is interested in requesting a turn for the service provided by a service location must connect to the queue management Bluetooth® transceiver. In some embodiments, due to the range limitations of Bluetooth® transmissions, the person is only able to connect to the queue management Bluetooth® transceiver to request a turn when the person is in physical proximity to the queue management Bluetooth® transceiver, and therefore physically located at the waiting area.

In 'b', a person requests a turn through a turn-distributing terminal positioned in a waiting area and the person is assigned a turn in the queue.

In some embodiments, in which the turn-distributing terminal comprises a queue management kiosk physically located at the waiting area, the person requests a turn by interacting with the queue management kiosk, such as by pressing a button (virtual or physical) on the queue management kiosk or by interacting with a graphic user-interface of the queue management kiosk.

In some embodiments, in which the turn-distributing terminal comprises a biometric queue management kiosk physically located at the waiting area, the person requests a turn by providing biometric identification information to the biometric queue management kiosk, such as by the person placing a finger on a fingerprint scanner of the biometric queue management kiosk, or by the person allowing his or her eye to be scanned by an iris scanner of the biometric queue management kiosk.

In some embodiments, in which the turn-distributing terminal comprises a queue management Wi-Fi access point, the person requests a turn by connecting to the queue management Wi-Fi access point. In some such embodiments, due to the range limitations of Wi-Fi transmissions, the person is only be able to connect to the queue management Wi-Fi access point to request a turn when the person is in physical proximity to the queue management Wi-Fi access point, and therefore physically located in at the waiting area.

In some embodiments, in which the turn-distributing terminal comprises a queue management Bluetooth® transceiver, the person requests a turn by connecting to the queue management Bluetooth® transceiver. Due to the range limitations of Bluetooth® transmissions, the person is only be able to connect to the queue management Bluetooth® transceiver to request a turn when the person is in physical proximity to the queue management Bluetooth® transceiver, and therefore physically located at the waiting area.

In some embodiments the person is also provided with a turn-ticket designating a turn in the usual way. Any suitable turn-ticket, including turn-tickets known in the art, may be used in implementing the teachings herein, e.g., a standard turn-ticket such as a physical turn-ticket of printed paper or cardboard, a plastic card, an electronic turn-ticket, for example sent to a mobile communication device, for example as a text message (e.g., short message service, SMS) or as an electronic mail (e-mail) message. In some embodiments, the turn-ticket is provided substantially immediately after the request for the turn. In some embodiments, the turn-ticket is provided subsequent to other events, e.g., 'c' or 'd'.

In 'c', a person requesting a turn in the queue is also offered the option to receive at least one warning communication warning of the approach of the assigned turn.

For example, in embodiments in which the person physically accesses the turn-distributing terminal, such as embodiments in which the turn-distributing terminal comprises a queue management kiosk or a biometric queue management kiosk physically located at the waiting area, the turn-distributing terminal includes a graphic-user interface such as a touch-screen and the person is allowed to choose whether or not to receive the at least one warning communication.

For example, in embodiments in which the person requests a turn in the queue by wireless communication with the turn-distributing terminal from a mobile communication device, such as embodiments in which the turn-distributing terminal comprises a queue management Wi-Fi access point or a queue management Bluetooth® receiver, the turn-distributing terminal sends a communication to the person's mobile communication device asking whether or not the person wishes to receive the at least one warning communication. In some such embodiments, the sent communication is a text message (e.g., short message service, SMS) or an electronic mail (e-mail) message. In some such embodiments, the person must confirm his desire to receive the at least one warning communication, for example by responding to the communication sent by the turn-distributing terminal.

In some embodiments, if the person is not interested in receiving at least one warning communication the person is treated in the usual way known in the art. As the queue advances, the following few turns are announced in a reception area (for example, over a speaker system and/or on a sign board). The person must be located in the reception area to monitor the advancement of the queue and must pay careful attention to the announcements so as not to miss the turn. The person can choose to leave the reception area, for example to go shopping or do other things, but then risks losing the turn in the queue.

In 'd', if the person accepts the offer to receive the at least one warning communication, the person supplies a (wireless) communication route, for example a contact number of a mobile communication device such as the number of a cellular telephone or an email address or instant messaging username which are accessible via a mobile communication device.

For example, in embodiments in which the person physically accesses the turn-distributing terminal, such as embodiments in which the turn-distributing terminal comprises a queue management kiosk or a biometric queue management kiosk physically located at the waiting area, the turn-distributing terminal includes a graphic-user interface such as a touch-screen and the person enters a cellular telephone number in response to a request therefore in the usual way. For example, the turn-distributing terminal includes a magnetic card-reader and the person "swipes" a magnetic card storing a cellular telephone number which is read from the magnetic card.

In some embodiments, accepting a communication route of the person is indirect, for example is accepted when the identity of the person is determined, for example by the person providing biometric identification information, upon payment with a credit card, or upon entry of some identification code, and the actual number is retrieved from storage, for example a credit card database.

In some embodiments, accepting the communication route of the person is through the turn-distributing terminal. For example, in embodiments in which the person physically accesses the turn-distributing terminal, such as embodiments in which the turn-distributing terminal comprises a queue management kiosk or a biometric queue management kiosk physically located at the waiting area, the turn-distributing terminal includes a graphic-user interface such as a touch-screen and the person enters a communication route (e.g., contact number of a mobile communication device, an email address, or a username of an instant messaging service) in response to a request therefor displayed on the graphic-user interface in the usual way.

For example, in embodiments in which the person accesses the turn-distributing terminal by wireless communication, such as embodiments in which the turn-distributing terminal comprises a queue management Wi-Fi access point or a queue management Bluetooth® receiver, the turn-distributing terminal knows from which wireless communication device it received the request, and registers a method of communicating with that wireless communication device as the communication route.

Requiring that the communication route be accepted through the turn-distributing terminal is an important aspect of some embodiments of the method described herein as it contributes to ensuring that the person is located at the waiting area, the importance of which is discussed hereinbelow.

The person can then choose to leave the reception area and is therefore generally unable to monitor the announcements relating to the advancement of the queue in the reception area. However, in accordance with the teachings herein, in 'e', prior to arrival of the person's turn, at least one warning communication of the approach of the assigned turn is transmitted to the person. As a result, the person is free to leave the reception area with the knowledge that they will receive a warning communication and be able to return in time for the turn.

In some embodiments, when possible, a warning communication includes time information, that is to say, a warning communication includes an accurate or estimated time until the assigned turn arrives.

In some embodiments, a warning communication includes information of what turn is currently being served, e.g., includes the actual turn served or includes the number of turns preceding the turn of the person. In some such embodiments, the warning communication also includes an average turn duration (for example, based on past/historical turn durations), or a predicted waiting time.

In some embodiments, a single warning communication is transmitted to the person. In some embodiments, more than one warning communication is transmitted to the person. In some embodiments, the person is allowed to select the number of warning communications to be transmitted. For example, in embodiments in which the person physically accesses the turn-distributing terminal, such as embodiments in which the turn-distributing terminal comprises a queue management kiosk or a biometric queue management kiosk physically located at the waiting area, the turn-distributing terminal includes a graphic-user interface such as a touch-screen and the person enters a desired number of warning communications in response to a request therefore in the usual way.

For example, in embodiments in which the person accesses the turn-distributing terminal by wireless communication, such as embodiments in which the turn-distributing terminal comprises a queue management Wi-Fi access point or a queue management Bluetooth® receiver, the number of warnings may be provided to the turn-distributing terminal by a second wireless communication, indicating the number of warnings, sent from the person's wireless communication device to the turn-distributing terminal.

In some embodiments, a person is required to pay for the warning communication, that is to say, transmitting the at least one warning communication is contingent on agreement to pay for at least one warning communication. For example, in embodiments in which the person physically accesses the turn-distributing terminal, such as embodiments in which the turn-distributing terminal comprises a queue management kiosk or a biometric queue management kiosk physically located at the waiting area, the turn-distributing terminal includes a graphic-user interface such as a touch-screen and the person enters a payment method (e.g., enters a credit card number, "swipes" a credit card or debit card, swipes an "electronic wallet" (e.g., using RFID or NFC technology), pays with cash, pays using a mobile communication device (e.g., using a cellular telephone, for example by sending a text message (SMS) or adding the payment sum to a cellular telephone bill), pays using another payment mode) in response to a request therefore displayed on the graphic-user interface in the usual way.

For example, in embodiments in which the person accesses the turn-distributing terminal by wireless communication, such as embodiments in which the turn-distributing terminal comprises a queue management Wi-Fi access point or a queue management Bluetooth® receiver, the payment method may be provided to the turn-distributing terminal by a second wireless communication, indicating credit card information or electronic wallet information, sent from the person's wireless communication device to the turn-distributing terminal. Alternately, the person may pay using the mobile communication device used to communicate with the turn-distributing terminal (e.g., using a cellular telephone, for example by sending a text message (SMS) or adding the payment sum to a cellular telephone bill).

In such embodiments, a person "buys their freedom" by opting to pay for a warning communication. Additionally, the person who has paid does not take a turn in the queue lightly, but rather becomes dedicated to actually waiting for their turn and will be less likely to give up on the service and leave. In such a way, in some embodiments the operator of a queue management method as described herein is able to recoup at least some of the costs associated with implementing the method and in some embodiments even makes a profit.

In some embodiments, the transmitting of the at least one warning communication is contingent on receipt of a valid response to a confirmation communication transmitted through the communication route. For example, a communication route is accepted from a person interested in receiving at least one warning communication, and a confirmation communication is subsequently sent to the communication route, for example, the communication route is a contact number of a mobile communication device and the confirmation communication is a message (e.g., text message, image message, audible message) sent to the mobile communication device. If the communication route is valid, the person receives the confirmation communication and validly responds to the confirmation communication. A valid response is a response that includes the correct content as required from the person. In some embodiments a valid response to a confirmation communication is response sent within a limited time of transmission of the confirmation communication (in some embodiments within less than about 10 seconds or within less than about 5 seconds).

If a valid response is received to the confirmation communication, it is understood that the person is interested in receiving the at least one warning communication.

In some embodiments, if no response or no valid response is received to the confirmation communication, it is understood that the person is not interested in receiving the at least one warning communication or the accepted communication route is incorrect. In some embodiments, the dialogue with the person ends. In some embodiments, a new confirmation communication is sent giving the person an additional chance to provide a valid response.

In some embodiments, transmitting of the at least one warning communication is contingent on receipt of a reply to the confirmation communication through the turn-distributing terminal.

For example, in embodiments in which the person physically accesses the turn-distributing terminal, such as embodiments in which the turn-distributing terminal comprises a queue management kiosk or a biometric queue management kiosk physically located at the waiting area, the turn-distributing terminal includes a graphic-user interface such as a touch-screen and the person enters their cellular telephone number in response to a request for a communication route. A confirmation communication is transmitted to the cellular telephone, for example a five digit number is transmitted as a text message.

The person then uses the touch-screen of the turn-distributing terminal to enter the five-digit number as reply to the confirmation communication. The reply is received. If the five-digit number entered and received through the turn-distributing terminal is the same as the five-digit number sent in the confirmation communication, the response is a valid response and it is understood that the person is interested in receiving the at least one warning communication. If the five-digit number entered and received through the turn-distributing terminal is not the same as the five-digit number sent in the confirmation communication, the response is not considered a valid response and it is understood that the person is not interested in receiving the at least one warning communication or the accepted communication route is incorrect. In some embodiments, the dialogue with the person ends. In some embodiments, a new confirmation communication is sent giving the person an additional chance to provide a valid response.

Requiring that a response to a confirmation communication be accepted through the turn-distributing terminal is an important aspect of some embodiments of the method described herein as it contributes to ensuring that the person is located at the waiting area, the importance of which is discussed hereinbelow.

After it is confirmed that the person is interested in receiving at least one warning communication, a communication route is accepted and (if required) an agreement to pay for receiving the warning communications is received, the person is free to wait in the reception area or to go about doing other activities, for example in the waiting area. In 'e', prior to when the assigned turn arrives and the person may receive the service provided at the service location, the person receives one or more warning communications so that the person is able to monitor the progress of the queue and to estimate when their turn at the queue arrives, despite not being physically present in the reception area. The person is therefore much calmer and can enjoy themselves and/or make more efficient use of otherwise wasted time. By paying attention to the at least one warning communications, the person can arrive at the reception area just prior to their turn.

In some embodiments, at least one warning communication is transmitted to the communication route. For example, a person provides their cellular telephone number as a communication route and one or more of the warning communications is transmitted to the person through the cellular telephone.

In addition to improving the quality of service given to a person who is in the queue, in some embodiments the method of queue management described herein provides advantages to the provider of the service at the service location. For example, with the same number of people in the queue, there are fewer people waiting in a reception area. It is thus possible to reduce the physical size of the reception area, saving expenses or allowing more service personnel to be employed. In some embodiments, the number of persons who take a turn in the queue but do not stay to receive service because of the duration of the wait is reduced because the queue waiting time is not wasted but can be used for other things.

A person who has agreed to receive at least one warning communication is a person whose communication route is known and who has a certain (known or estimable) amount of free time. Additionally, the person's physical location can be presumed to be in proximity of the waiting area because the person will want to be able to arrive in time for their turn, and in some embodiments because the turn-distributing terminal is located at a waiting area and the communication route is accepted through the turn-distributing terminal and/or a response to a confirmation communication is accepted through the turn-distributing terminal and/or the person agreed to pay for a warning communication.

In some embodiments, this information is used to send advertisements to the person, that is to say in some embodiments subsequent to accepting the communication route, at least one advertisement is sent to the person. As an advertiser can be required to pay for an advertisement sent in accordance with the teachings herein, in some embodiments, sending an advertisement allows some of the costs of implementing the method to be recouped and even allow a profit to be made, while providing a person with useful advertisements and providing advertisers with an effective advertisement channel.

In some embodiments, a person is required to accept advertisements for the warning communication, that is to say, transmitting the at least one warning communication is contingent on agreement to receive an advertisement. In such embodiments, a person "buys their freedom" by opting to receive advertisements in exchange for a warning communication. In such a way, in some embodiments the operator of a queue management method as described herein is able to recoup at least some of the costs associated with implementing the method and in some embodiments even makes a profit.

Any suitable advertisement is sent. In some embodiments, a sent advertisement is informative, that is to say, informs or reminds the person of the existence of an available product or service. In some embodiments, a sent advertisement includes a sale, that is to say includes an offer to purchase a product or services at a lower-than-usual price. In some embodiments such a sale is valid for a limited time, for example valid for the day of sending of the advertisements. In some such embodiments, a person "buys their freedom" and in exchange also receives the opportunity to take advantage of a sale, that in some embodiments may otherwise be unavailable.

In some embodiments, at least one advertisement is provided to the person through the turn-distributing terminal, for example as printed a ticket or coupon. In some embodiments, at least one advertisement is sent through the communication route, for example, sent by message (text, audible, graphic) to a person's cellular telephone or email address, assisting in ensuring that the person who receives the advertisement is the person who is assigned a turn in the queue.

In some embodiments, sending an advertisement to the person is contingent on receiving the person's consent. For example, in embodiments in which the person physically accesses the turn-distributing terminal, such as embodiments in which the turn-distributing terminal comprises a queue management kiosk or a biometric queue management kiosk physically located at the waiting area, the turn-distributing terminal includes a graphic-user interface such as a touchscreen and after it is confirmed that the person is interested in receiving warning communications, the person agrees to receipt of advertisement upon being asked if this is acceptable.

For example, in embodiments in which the person accesses the turn-distributing terminal by wireless communication, such as embodiments in which the turn-distributing terminal comprises a queue management Wi-Fi access point or a queue management Bluetooth® receiver, the consent to receive advertisements may be provided to the turn-distributing terminal by an additional wireless communication sent from the person's wireless communication device to the turn-distributing terminal.

Some embodiments of the method described herein allow focused advertising. As noted above, the amount of time and the location of the person in the waiting area are known.

Advertisers are therefore able to rationally decide what services are attractive to the person, and offer these to the person in a selected advertisement.

In some embodiments, an advertisement selected to be sent is for a service available in proximity of the waiting area. For example, a place of business (e.g., a restaurant, a shop) in a shopping mall where a pharmacy implementing queue management as described herein advantageously advertises to a person who is most likely in the shopping mall while waiting for their turn in the queue. For example, a shopping mall restaurant offers a 10% reduction of the price of coffee to a person who has an expected waiting time of about 1 hour in a queue for a pharmacist. For example, a hotel in a waiting area 10 km from a cargo container depot offers a 10% reduction of the price of a room to a truck driver who has an expected waiting time of about 8 hours in a queue for a cargo-container depot.

In some embodiments, an advertisement selected to be sent is for a service available in proximity of a route between the turn-distributing terminal and the service location. For example, a restaurant located on the route between a waiting area including a turn-distributing terminal and a cargo-container depot offers a 10% reduction on the price of a meal to a truck driver who has an expected waiting time of about 2 hours in a queue for a cargo container depot.

In some embodiments, the nature of an advertisement selected to be sent is related to a waiting time for the turn, e.g., the advertisement is selected according to an estimated or expected waiting time. For example, if the waiting time is estimated to be 3 hours, an advertisement to see a film that starts within 20 minutes in a cinema is sent. For example, if the waiting time is estimated to be 2 hours, an advertisement to eat a meal is sent. For example, if the waiting time is estimated to be 30 minutes, an advertisement to drink a cup of coffee is sent.

In some embodiments, the nature of an advertisement selected to be sent is related to the nature of the service provided at the service location, e.g., the advertisement is selected according to the type of service provided at the service location, for example, for which the person is waiting in the queue. For example, if the queue is for service of a governmental office that caters to senior citizens, an advertisement for mobility aids is sent.

In some embodiments, the nature of an advertisement selected to be sent is related to the nature of the person, e.g., the advertisement is selected according to at least one (known or expected) characteristic of the person, such as, for example, age, gender, profession, purchase history, and the like. For example, stored information about the person is recovered with the help of a payment method or the communication route (e.g., from a database of a credit card company, of a store "club card", of a mobile telephony company or of a government office), and used to select an appropriate advertisement to be sent. For example, a credit card company records that a person purchases children's clothes. When the person uses the credit card to pay for a warning communication, an advertisement for purchasing children's books is sent.

In some embodiments, the nature of an advertisement selected to be sent is related to a choice made by the person, e.g., the advertisement is selected according to a choice made by the person. For example, in embodiments in which the person physically accesses the turn-distributing terminal, such as embodiments in which the turn-distributing terminal comprises a queue management kiosk or a biometric queue management kiosk physically located at the waiting area, the turn-distributing terminal includes a graphic-user interface such as a touch-screen and the person is provided with a list of the types of advertisements that are available (e.g., "food and drink", "entertainment" and "other"). The person uses the touch-screen to select the type or category of advertisements they are interested in receiving.

For example, in embodiments in which the person accesses the turn-distributing terminal by wireless communication, such as embodiments in which the turn-distributing terminal comprises a queue management Wi-Fi access point or a queue management Bluetooth® receiver, the person's choice of advertisements may be provided to the turn-distributing terminal by an additional wireless communication sent from the person's wireless communication device to the turn-distributing terminal. The additional wireless communication includes a type of advertisements the person wishes to receive, the type of advertisements typically being selected from a list of available types of advertisements (e.g., "food and drink", "entertainment" and "other").

In some embodiments, the manner of selecting a specific advertisement to be sent is dynamic, that is to say, the at least one advertisement sent from amongst a collection of advertisements is changed during a day.

In some embodiments, a change in the manner of selecting a specific advertisement to send is initiated by an advertiser, for example in response to a change in conditions at the advertiser's location. For example, the advertiser's location is too busy so an advertisement is removed, e.g., a coffee shop has too many customers at a specific time, so advertisements advertising the coffee shop are no longer sent, are made less attractive or a sale is offered for an earlier or later time. For example, as the end of a day approaches an advertising restaurant becomes aware that there is an excess of a certain dish available so an advertisement offering the certain dish for sale at a bargain price is sent. For example, an advertisement including a sale is too attractive and attracts too many customers, so the advertisement is changed so that the sale is less attractive.

In some embodiments, a change in advertisement is initiated by the operator of the queue management system as described herein, for example in response to a change in conditions at the service location. For example, in some embodiments when an unexpectedly high number of persons have joined the queue, or the queue is advancing at an unusually slow rate, the operator of the queue management system contacts an advertiser to offer the chance of sending additional or special advertisements.

In some embodiments, such changes in the manner of selecting advertisements are performed automatically. In some embodiments, such changes are performed semi-automatically or manually, for example, by a person working for the advertiser and/or a person working for the operator of the queue management system such as an administrator.

An embodiment of the method of queue management disclosed herein is described with reference to FIG. 1A schematically depicting a waiting area, FIG. 1B schematically depicting a queue-management controller and FIG. 1C a flow-chart schematically depicting the queue management.

In FIG. 1A, a pharmacy counter 10 (the service location) in a drug store 12 is located in a shopping mall 14 (the waiting area). In a reception area 16 of pharmacy counter 10 is positioned a turn-distributing terminal 18. In some embodiments, turn-distributing terminal 18 comprises a kiosk including a touch-screen and a thermal turn-ticket printer. In other embodiments, turn-distributing terminal 18 comprises a Wi-Fi access point. Turn-distributing terminal 18 is functionally associated (e.g., through WiFi wireless communication) with a queue management controller 20 (comprising a computer connected to the Internet configured as a queue management controller with appropriate hardware and/or software). Also functionally associated with queue management controller 20 are counter terminal 22, display board 24 (an LED display that is visible only to people in reception area 16) and communication line 25 (e.g., an Internet text or voice messaging service such as a "chat" service) to an advertiser 27, a place of business located in shopping mall 14.

Queue management controller 20 (see FIG. 1B) comprises a computer (e.g., as known in the art of queue management) and includes a number of software data structures: a current turn served 202 (a variable record storing an integer designating the current turn in the queue being served), last turn assigned 204 (a variable record storing an integer designating the last assigned turn in the queue), a database 206 of persons assigned numbers who want to receive warning communications, where each record of the database includes a turn in the queue assigned to the person 206a, a communication route to the person 206b, such as a cellular telephone number of the person or an email address of the person, and a list of warning times 206c. Controller 20 also includes a collection of different advertisements in a database 208 where each record includes text of the advertisement 208a, a time window 208b (a minimum and/or maximum queue waiting time for which it is desired to send the advertisement) and an advertisement type 208c ("food and drink", "entertainment" and "other").

In the usual way of queue management, controller 20 displays the value of current turn served 202 on display board 24. Periodically, a worker at pharmacy counter 10 uses counter terminal 22 to indicate to controller 20 that a client has been helped and the next client may approach pharmacy counter 10. Controller 20 increments the value of current turn served 202. Controller 20 displays a "welcome" screen on turn-distributing terminal 18, 100 in FIG. 1C.

A person needing a service from pharmacy counter 10 arrives at reception area 16 and requests a turn from turn-distributing terminal 18. In some embodiments, in which turn-distributing terminal 18 comprises a touch screen, the person requests the turn by using the touch screen of turn-distributing terminal 18. In some embodiments, in which turn-distributing terminal 18 comprises a Wi-Fi access point, the person requests the turn by using a mobile communication device to communicate with the Wi-Fi access point of turn-distributing terminal 18. Controller 20 receives the request for a turn in the queue from turn-distributing terminal 18, 102 in FIG. 1C.

Upon receiving the request, controller 20 increments last turn assigned 204 and sends the value of last turn assigned 204 to turn-distributing terminal 18, thereby assigning the person a turn in the queue. Subsequently, turn-distributing terminal 18 provides the person with a turn-ticket indicating the person's number in the queue, 104 in FIG. 1C.

In some embodiments, in which turn-distributing terminal 18 comprises a thermal turn-ticket printer, turn-distributing terminal 18 provides the person with a paper turn-ticket on which is printed the value of last turn assigned 204 received from controller 20. In some embodiments, in which turn-distributing terminal 18 comprises a Wi-Fi access point, turn-distributing terminal 18 sends a wireless communication (e.g. text message, SMS, email message, instant messaging service message), including the value of last turn assigned 204 received from controller 20, to the mobile communication device used to communicate with the Wi-Fi access point of turn-distributing terminal 18.

Figure 1C:
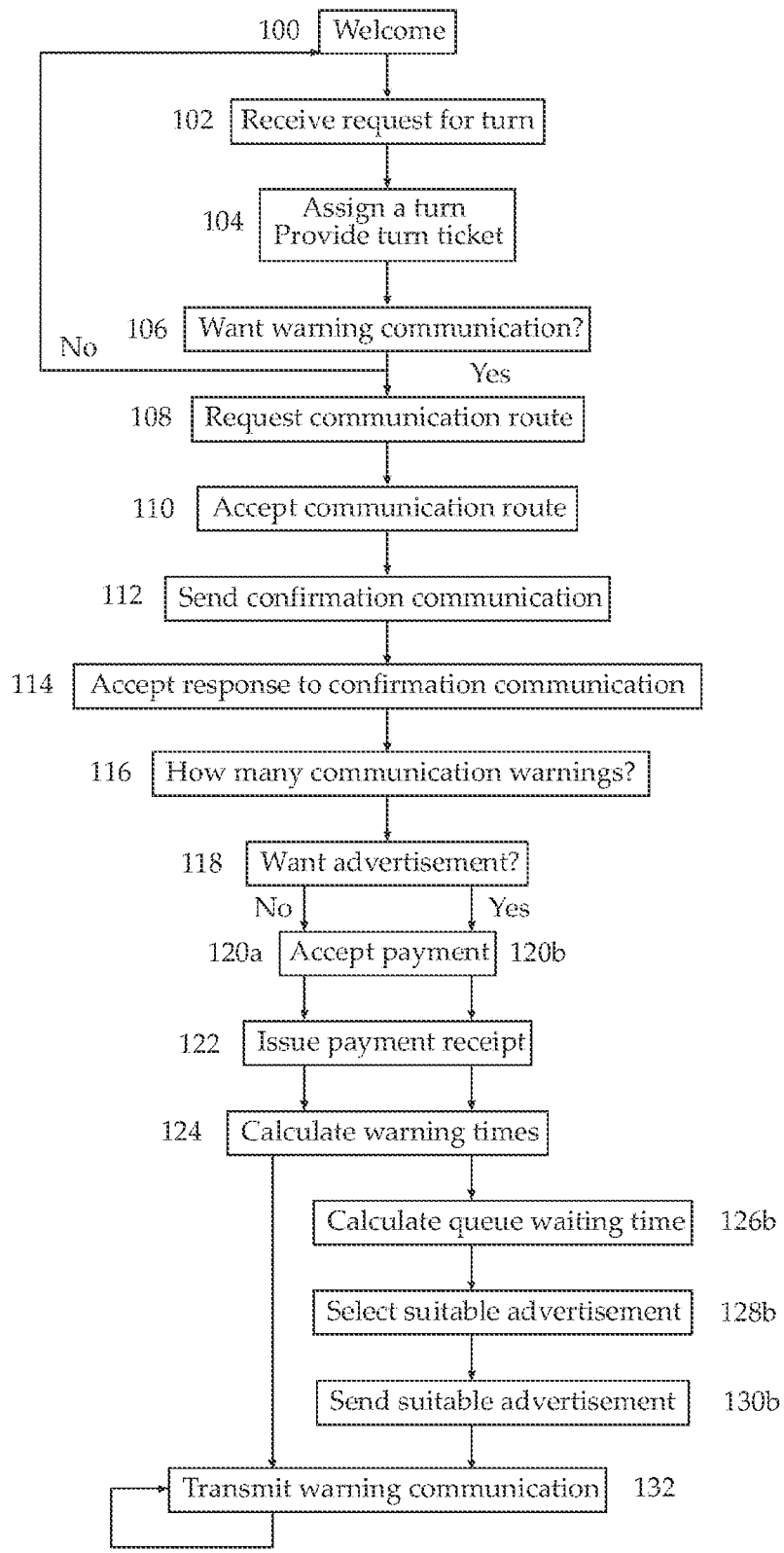
FIG. 1C is a flow-chart describing an exemplary embodiment of the method of queue management described herein.

Using turn-distributing terminal 18, controller 20 queries the person "do you want a warning communication for $1?", 106 in FIG. 1C. In some embodiments, in which turn-distributing terminal 18 comprises a display and a touch screen, the query is presented to the person on the display. In some embodiments, in which turn-distributing terminal 18 comprises a Wi-Fi access point, the query is presented to the person in a wireless communication (e.g. text message, SMS, email message, instant messaging service message) sent from the Wi-Fi access point to the person's mobile communication device.

The person compares the assigned turn and current turn served 202 displayed on display board 24 to decide if it is worth the price to receive a warning communication. If the person does not respond within 10 seconds or responds negatively by touching the appropriate button on the touch-screen of turn-distributing terminal 18 or by sending a mobile communication indicative of his negative response to turn-distributing terminal 18, controller 20 returns turn-distributing terminal 18 to the "welcome" screen 100 in FIG. 1C.

In embodiments in which turn-distributing terminal comprises a touch screen, if the person accepts the offer to receive a warning communication using the touch-screen of turn-distributing terminal 18, controller 20 displays a request for a communication route using turn-distributing terminal 18 "please enter your cellular telephone number", 108 in FIG. 1C.

If the person enters a cellular telephone number in the touch-screen of turn-distributing terminal 18 from which controller 20 accepts the cellular telephone number as a communication route, 110 in FIG. 1C.

Alternately, for example in embodiments in which turn-distributing terminal comprises a Wi-Fi access point, if the person accepts the offer to receive a warning communication by sending a mobile communication indicating an affirmative response to the turn-distributing terminal 18, the turn-distributing terminal 18 identifies the mobile device from which the person sent the mobile communication, such as a cellular telephone, tablet computer, or laptop computer, and records the communication route of the mobile device as the communication route to the person.

Controller 20 sends a text message (e.g., SMS), or other suitable message based on the communication route defined for the person, including a five-digit number through the Internet (as known in the art) as a confirmation communication to the cellular telephone number or other communication route, 112 in FIG. 1C.

In some embodiments, in which turn-distributing terminal 18 comprises a touch screen, controller 20 uses the touch-screen of turn-distributing terminal 18 to display a request for a response to the confirmation communication using turn-distributing terminal 18 "please enter the five-digit number you have just received on your cellular telephone", 114 in FIG. 1C.

In such embodiments, the person enters the received five-digit number using turn-distributing terminal 18. Controller 20 receives the entered five-digit number. Receipt of the five-digit number sent in the confirmation communication entered using the touch-screen of turn-distributing terminal 18 is considered receipt of a valid response to the confirmation communication. Controller 20 displays a query "how many warning communications would you like?", 116 in FIG. 1C.

In response, the person enters the desired number of warning communication using the touch-screen of turn-distributing terminal 18, and the number is accepted by controller 20. Controller 20 displays a query using the touch-screen of terminal 18 "would you like to hear our special offers?" and is given a choice of four responses: "No", "Yes—food and drink", "Yes—entertainment" and "Yes—other", 118 in FIG. 1C.

The person makes a selection of one or more of the four responses on the touch screen of terminal 18, in the usual way.

If the response is "No", controller 20 displays a request for payment using the touch-screen of turn-distributing terminal 18 "please swipe your card to pay for your warning communications", 120a in FIG. 1C. The person pays (using any suitable method, for example sending an SMS or paying with a credit card, a debit card, cash, or an "electronic wallet" through a suitably configured turn-distributing terminal 18) and receives a payment receipt from the printer of turn-distributing terminal 18, 122 in FIG. 1C.

If the person responds by choosing to receive an advertisement, controller 20 displays a request on terminal 18 "please swipe your card to pay for your warning communications, our offers will be sent to you shortly", 120b in FIG. 1C. The person pays in the usual way (as described above) and receives a payment receipt from the printer of turn-distributing terminal 18, 122 in FIG. 1C.

Alternately, in embodiments in which turn-distributing terminal 18 comprises a Wi-Fi access point, the confirmation message including the five-digit number additionally includes instructions for the person how to respond. For example, the message instructs the person to send to the turn-distributing terminal 18 a mobile communication including the sum of the five digits included in the confirmation message, in order to provide the necessary confirmation of receipt.

In such embodiments, the person sends the mobile communication including the sum of the digits included in the confirmation message to turn-distributing terminal 18. Controller 20 receives the sum number from turn-distributing terminal 18. Receipt of the sum of the digits in the five digit number sent in the confirmation communication via a mobile communication sent to turn-distributing terminal 18 is considered receipt of a valid response to the confirmation communication. Controller 20 then uses turn-distributing terminal 18 to send a mobile communication including a query "how many warning communications would you like?" to the person's mobile device.

In response, the person sends a mobile communication indicating the desired number of warning communications to turn-distributing terminal 18, and the number is accepted by controller 20. Controller 20 uses turn-distributing terminal 18 to send a mobile communication including a query "would you like to hear our special offers?" to the person's mobile device. The mobile communication may also provide the person with a list of four legitimate responses: "No", "Yes— food and drink", "Yes—entertainment" and "Yes—other".

The person sends a mobile communication indicating the selection of one or more of the four responses to turn-distributing terminal 18.

If the response is "No", controller 20 uses turn-distributing terminal 18 to send a mobile communication including a request for payment such as "please provide a method of payment for your warning communications", 120a in FIG. 1C. The person pays (using any suitable method, for example sending an electronic communication including payment information, or paying with a credit card, a debit card, cash, or an "electronic wallet" through a suitably configured turn-distributing terminal 18, or by indicating that the charge should be added to the person's next cellular-telephone bill) and receives a payment receipt from the printer of turn-distributing terminal 18 or as a mobile communication sent from turn-distributing terminal 18, 122 in FIG. 1C.

If the person responds by choosing to receive an advertisement, controller 20 uses turn-distributing terminal 18 to send a mobile communication including a request for payment such as "please provide a method of payment for your warning communications, our offers will be sent to you shortly", 120b in FIG. 1C. The person pays in the usual way (as described above) and receives a payment receipt from the printer of turn-distributing terminal 18 or as a mobile communication sent from turn-distributing terminal 18, 122 in FIG. 1C.

Controller 20 adds a new record to database 206 of persons who want warning communications and stores the turn assigned to the person in 206a, the accepted cellular telephone number or other communication route in 206b and the requested number of warning times in 206c.

The specific values of the warning times stored in 206c are calculated in any suitable way, 124 in FIG. 1C. For example, in some embodiments, the latest warning time in 206c is always set to be when the person has two more turns to wait, and additional warnings are spaced substantially equally with any remainder delaying the first warning communication.

For example, if an assigned turn is 100, the current turn served is 53 and the person requests 5 warning communications, the list of warning times stored in 206c consists of 98, 89, 80, 71 and 62 so that the person receives a warning communication every 9 turns, that is to say, a warning communication will be transmitted to the cellular telephone number stored in 206a when current turn served 202 has a value of 62, 71, 80, 89 and 98.

For example, if the assigned turn is 100, the current turn served is 53 and the person requests 4 warning communications, the list of warning times stored in 206c consists of 98, 84, 70 and 56 so that the person receives a warning communication every 14 turns, except the first warning communication which is after 17 turns, that is to say, a warning communication will be transmitted to the cellular telephone number stored in 206a when current turn served 202 has a value of 56, 70, 84 and 98.

If the person agreed to receive advertisements (118 in FIG. 1C), controller 20 calculates the person's queue waiting time, 126b in FIG. 1C (for example, as known in the art, e.g., number of turns to wait (difference between assigned turn 204 and current turn served 202) multiplied by the average turn duration) and selects suitable advertisements from the collection of advertisements 208, 128b in FIG. 1C. As noted above, collection of advertisements 208 includes texts of advertisements 208a of service providers and places of business located in shopping mall 14 (e.g., advertiser 27), a time window 208b (a minimum and/or maximum queue waiting time for which it is desired to send the advertisement) and advertisement type 208c. Suitable advertisements selected are advertisements that are of a type 208c ("food and drink", "entertainment" and "other") selected by the person that have a time window 208b that matches the person's queue waiting time.

Controller 20 sends each advertisement as an individual text message (e.g., SMS) or other message suitable for the communication route provided by the person, such as an email message or instant messaging message, through the Internet (as known in the art) to the cellular telephone number or other communication route stored in 206a, 130b in FIG. 1C.

For example, if the queue waiting time is between 15 and 60 minutes and the person selected "food and drink", an advertisement is sent "10% off on Joe's coffee" or "Get a free pie with each Jolly Meal at Clowny's Burgers". For example, if the queue waiting time is between 45 and 120 minutes and the person selected "food and drink", an advertisement is sent "free coffee if you order a steak at Dead Cow Crossing". For example, if the queue waiting time is between 30 minutes and 2 hours and the person selected "entertainment", an advertisement is sent "20 free tokens at Arkady's arcade". For example, if the queue waiting time is between 30 minutes and 10 hours and the person selected "other", an advertisement is sent "discounts on selected wallets at Wally's Wallet Emporium". For example, if the queue waiting time is between 60 minutes and 2 hours and the person selected "other", an advertisement is sent "get a pedicure at Paddy's".

Upon receiving the payment receipt (122 in FIG. 1C), the person is free to spend their queue waiting time with reduced tension, including waiting in reception area 16, in drug store 12, shopping mall 14 or even outside of shopping mall 14. If chosen, the person may review the sent advertisements and be influenced to spend time and/or money in a particular way by the advertisements.

As noted above, periodically a worker uses counter terminal 22 to indicate to controller 20 that a client has been helped and that a next client may approach pharmacy counter 10. Controller 20 increments the value of current turn served 202. Each time the value of current turn served 202 is incremented, controller 20 transmits a warning communication to the cellular telephone number or other communication route 206b of all persons in list of persons who accepted the offer to receive a warning communications and which have a warning time 206c corresponding to current turn served 202, as an individual text message (e.g., SMS), email message, or instant message, through the Internet (as known in the art), based on the communication route used by the person, 132 in FIG. 1C. For example, controller 20 transmits a warning communication "Turn 70 is being served. Your turn is 100. Since the average turn is 3 minutes, we expect your turn to be in about 90 minutes" or "Turn 84 is being served. Your turn is 100. Since the average turn is 2 minutes, we expect your turn to be in about 32 minutes".

The person monitors the transmitted warning messages, and when desired arrives at reception area 16 to receive service at pharmacy counter 10.

Throughout the day, advertiser 27 may identify a change in condition and communicates an instruction to change one or more advertisements to controller 20 through communication line 25. Automatically, controller 20 changes one or more advertisements in database 208 in accordance with the communicated instructions. For example, advertiser 27 (a café) sees that there are few tables available so communicates instructions to delete an advertisement for a reduced price lunch and add a new advertisement for take-away sandwiches.

Throughout the day, controller 20 may identify a change in conditions at pharmacy counter 10 (the service location) and communicates with advertiser 27 through communication line 25, offering the choice of sending a special advertisement. Advertiser considers the offer, and optionally communicates an instruction to change one or more advertisements to controller 20 through communication line 25, substantially as described above. For example, controller 20 identifies that the queue is longer than usual (e.g., compared to an average queue at the current time of day) so that there are more people than usual waiting for a longer time. Controller 20 uses communication line 25 to inform advertiser 27 of this fact. Advertiser 27 receives the communication and decides to send a new advertisement accounting for the large number of persons and/or the exceptionally long wait.

Figure 2:
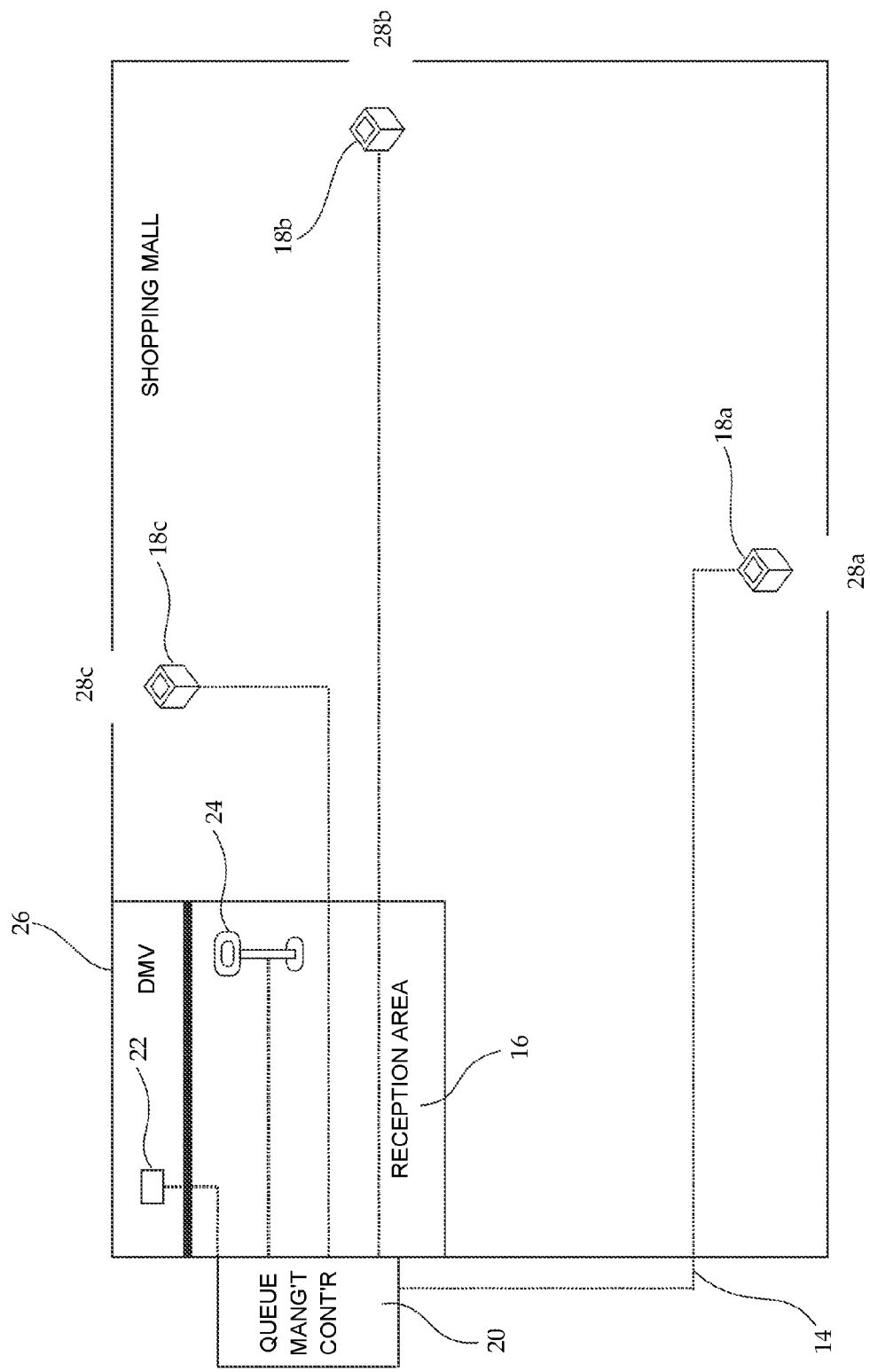
FIG. 2 is a schematic depiction of a service location that is a Department of Motor Vehicles in a shopping mall.

An additional embodiment of the method of queue management disclosed herein is described with reference to FIG. 2 schematically depicting a waiting area. In FIG. 2, an office of a Department of Motor Vehicles (DMV) 26 (the service location) is located in a shopping mall 14 (the waiting area) with three entrances 28. At each entrance 28a, 28b and 28c is positioned a turn-distributing terminal 18a, 18b and 18c, each turn-distributing terminal functionally associated with controller 20.

Queue management in the embodiment described with reference to FIG. 2 is substantially similar to that of the embodiment described with reference to FIG. 1 with a few substantial differences.

A first notable substantial difference is that turn-distributing terminals 18a, 18b and 18c are not positioned in a reception area 16, although still in proximity of the waiting area, shopping mall 14. A person interested in a turn for DMV 26 may request a turn at any one of turn-distributing terminals 18a, 18b and 18c and does not need to waste time going to DMV 26 itself.

A second notable substantial difference is that transmission of a warning communication is not contingent on agreement to pay for a warning communication. Instead, transmission of a warning communication is contingent on agreement to accept advertisements. A person choosing not to receive advertisements must wait in reception area 16 of DMV 26 to monitor the progress of the queue in the usual way. However, if a person agrees to receive advertisements and a valid reply to a confirmation communication is received, warning communications are transmitted to the person, substantially as described above.

During the process of offering a person the option of receiving at least one warning communication, controller 20 additionally uses a turn-distributing terminal 18a, 18b or 18c to enquire what service the person wants at DMV 26. In some embodiments, different requested services are managed in two or more different queues, each individually managed substantially as described above. For example, one queue is for persons interested in renewing their annual car license, a second queue is for persons interested in renewing their driving license because they are older than 70 and a third queue is for persons interested in receiving their first driving license.

In the embodiment discussed with reference to FIG. 1, the nature of an advertisement sent is related to the waiting time and a choice made by the person.

In the embodiment discussed with reference to FIG. 2, the nature of an advertisement sent is additionally related to the category or type of the service for which the person is waiting in the queue. For example, if a person indicates that they are interested in renewing their annual car license, an advertisement is sent "Free coffee at Joe's Car Repair Center" or "Buy oil additive to reduce engine emissions at Hucksters".

In the embodiment discussed with reference to FIG. 2, the nature of an advertisement sent is also related to the nature of the person, for example, at least one (known or assumed) characteristic of the person. For example, if a person indicates that they are interested in renewing a driver's license because they are older than 70, an advertisement targeted at older consumers is sent, for example "Come and hear about our Cruise Packages". For example, if a person indicates that they are interested in receiving a first driver's license they are assumed to be young and an advertisement targeted at younger consumers is sent, for example "20% off on Fallout Sunglasses at Jimmy's".

In some of the embodiments described above, a person who has agreed to receive at least one warning communication waits in the same queue as a person who has not agreed to receive a warning communication. In some embodiments, there is at least one dedicated queue for people who have agreed to receive at least one warning communication.

For example, it is known that in some service-providing instances, especially commercial instances such as supermarkets and department stores, there are more than one substantially identical check-out counters which constitute the service locations of the service-providing instance. A person desiring to make a purchase chooses one of the check-out counters and physically waits in the queue of that check-out counter.

Some embodiments of the method described herein are implemented in such instances. In some such embodiments, there is at least one dedicated queue for a specific service location (e.g., check-out counter) for people who have agree to receive at least one warning communication.

For example, in a supermarket, there is at least one turn-distributing terminal located in a waiting area (the supermarket itself).

A person realizing that they are nearing the end of their purchases approaches a turn-distributing terminal as described above, requests and receives a turn in a dedicated queue in exchange for agreeing to receive at least one warning communication. In some such embodiments, it is preferred that the request is performed with the help of a credit card or a "club card" (e.g., by swiping) that allows automatic accepting of a communication route of the person (e.g., from a database) and in some embodiments gives access to the person's purchasing history or other person-specific information. As discussed above, in some embodiments the person is provided with a turn-ticket.

In some embodiments, a turn-distributing terminal is positioned close to the check-out counter. In some embodiments, a turn-distributing terminal is positioned close to a specified rest area, for example, a "special offer" section, a magazine store, a café or bakery associated with the waiting area (the supermarket). In some embodiments, more than one turn-distributing terminals are distributed in various locations of the waiting area (the supermarket) so a person can more easily request a turn in the queue at any time.

In some such embodiments, requesting a turn is free. In some embodiments, requesting a turn requires payment of a fee, in some embodiments, a nominal fee, e.g., not more than 1% of the purchase.

Once the person has requested, and received, a turn in the queue, the person is ostensibly free and does not need to physically wait in the queue. The person is free to wander around the waiting area (the supermarket), purchase refreshment or rest. As described above, the person receives at least one warning communication of their approaching turn at the checkout counter, in some embodiments when the person is the next in line. When a warning communication is received, the person can physically approach the check-out counter to actually physically wait in queue for only a short time.

From the time the person requests a warning communication to the time at the turn at the checkout counter, it is known that that specific person is located in the waiting area (the supermarket) with a shopping cart of purchases, and therefore not practically able to leave.

In some embodiments, no further advertising activity is undertaken and the person enjoys their rest, possibly making an additional impulsive purchase in the supermarket.

In some embodiments where there is a specified rest area, no further advertising activity is undertaken but the person may make an additional impulsive purchase in the rest area, e.g., coffee, a cake, a magazine.

In some embodiments, advantage is taken of the knowledge that a specific person (with known purchasing habits and/or interests and/or demographics) is known to be in the waiting area (the supermarket). In some embodiments, advertisements are sent as described above, for example through the communication route, for example based on information about the person, for example stored information acquired from the credit card or "club card". Such advertisements are typically for products found in the supermarket.

Figure 3:
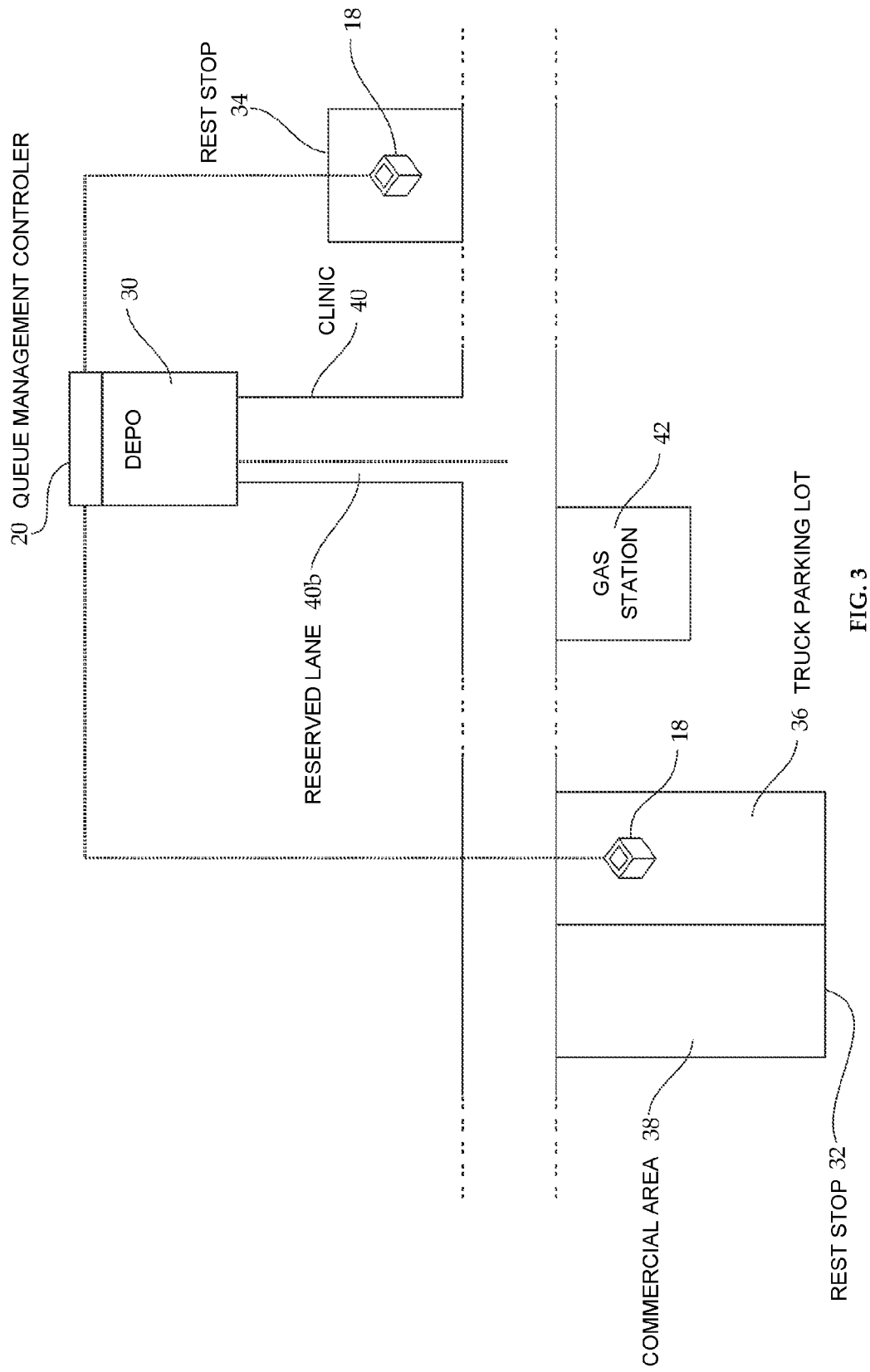
FIG. 3 is a schematic depiction of a service location that is a rest area near a cargo container depot.

An additional embodiment of the method of queue management disclosed herein is described with reference to FIG. 3. In FIG. 3, a cargo-container depot 30 (the service location) is located 10 km north of a first rest stop 32 and 10 km south of a second rest stop 34, in both cases less than 30 minutes drive from cargo-container depot 30. First rest stop 32 includes a truck parking lot 36, a commercial area 38 including hotels, massage parlours and restaurants) and a turn-distributing terminal 18. Second rest stop 34 is substantially identical to first rest area 32 and is therefore not discussed further herein.

A truck driver is sent to cargo-container depot 30 to pick-up or return an empty cargo container. The truck-driver knows that the wait in the queue at depot 30 can be anything from 6 to 12 hours. The truck driver stops at first rest stop 32 and requests a turn from turn-distributing terminal 18. The queue is managed substantially analogously to that described above with reference to FIGS. 1 and 2.

If the truck driver is not interested in receiving the offered at least one warning communication, controller 20 assigns the truck driver a turn in the queue, provides a turn-ticket (e.g., physical or virtual) designating the assigned turn through turn-distributing terminal 18. The truck-drive proceeds to park in the physical queue of trucks on an access road 40 to cargo-container depot 30. In the usual way of cargo-container depots (First In First Out), when depot 30 is able to provide service to a truck, the truck closest to depot 30 on access road 40 enters depot 30 and the rest of the trucks in the physical queue advance a truck length. During the wait, a truck driver waiting in the physical queue may rest or sleep in a truck.

If a truck driver requesting a turn in the queue is interested in receiving at least one warning communication and requests to receive at least one warning communication at turn-distributing terminal 18, the request is treated as described herein.

The truck driver is assigned a turn in the queue and provided with a turn-ticket and is free to spend her time as she will without necessarily waiting in the physical queue, knowing that at least one warning communication will be transmitted to her cellular telephone. In the specific embodiment discussed herein, one warning communication is transmitted when the number of turns in the queue to be served prior to the turn assigned to the truck driver corresponds to about an hour wait. As the time required for container loading and unloading is known relatively accurately, the estimate of such a queue waiting time is relatively accurate. Upon receipt of the warning communication, the truck driver drives in reserved lane 40b on access road 40, bypassing trucks parked in the physical queue of access road 40. In such a way, the truck driver is able to enter cargo-container depot 30 when her actual turn arrives.

As above, advertisements are sent to the truck driver. Some advertisements sent are for service available in proximity of first rest stop 32 (the waiting area), for example services offered in commercial area 38.

For example, if the queue waiting time is between 6 and 7 hours, an advertisement is sent "spend the night at Hotel Sombrero" or "come and eat breakfast at Barbara's tomorrow morning before you drive to the depot". For example, if the queue waiting time is between 2 and 3 hours, an advertisement is sent "Shiatsu and sauna, 25% off" or "Edward's hair salon is open, look good for that depot!".

As with the embodiment discussed with reference to FIG. 1, the nature of advertisements sent is related to the waiting time and a choice made by the person. Additionally, in the embodiment discussed with reference to FIG. 3, some advertisements are for a service available in proximity of a route between turn-distributing terminal 18 and cargo-container terminal 20, the service location. For example, in some such embodiments, an advertisement is sent for a gas station 42 on the road between first rest area 32 and cargo-container depot 30, for example, an advertisement is sent "Don't just drive by! Get our world famous Haggis with your coffee at Mel's Gas Station".

As known in the art, in queues of some service locations (e.g., medical clinics) many or most of the persons who are interested in service from the service location have pre-ordered a turn in the queue, for example, from a remote location by telephone or Internet, usually the pre-ordered turn expressed in terms of a specific designated time to receive the service. A person arriving at the designated time is rarely served at the designated time, both due to time overruns and due to a policy to ensure that the service provider is always busy. As a result, the person must wait in a queue even when a turn is pre-ordered.

An additional embodiment of the method of queue management disclosed herein including pre-ordered turns in a queue is described with reference to FIG. 4. In FIG. 4A, a medical clinic 40 (the service location) is located in a shopping mall 14 (the waiting area) where clinic 40 includes a reception area 16 with a turn-distributing terminal 18. In FIG. 4B is a part of a flow-chart schematically depicting the queue management.

Queue management in the embodiment described with reference to FIG. 4 is substantially similar to that of the embodiments described above.

In the usual way of queue management, controller 20 displays the value of current turn served and the following turn served on display board 24. Periodically, a worker (e.g., a medical secretary) uses a counter terminal 22 to indicate to controller 20 that a client has been helped and the next client may receive assistance at medical clinic 40. Controller 20 increments the value of current turn served 202. Controller 20 displays a "welcome" screen on turn-distributing terminal 18, 100 in FIG. 4B.

Unlike the "welcome" screen discussed above with reference to FIG. 1, controller 20 displays two choices "I want to see a doctor" or "I have already reserved a turn".

A person needing service from medical clinic 40 arrives in reception area 16 and requests a turn using the touch-screen of turn-distributing terminal 18.

Figure 4B:
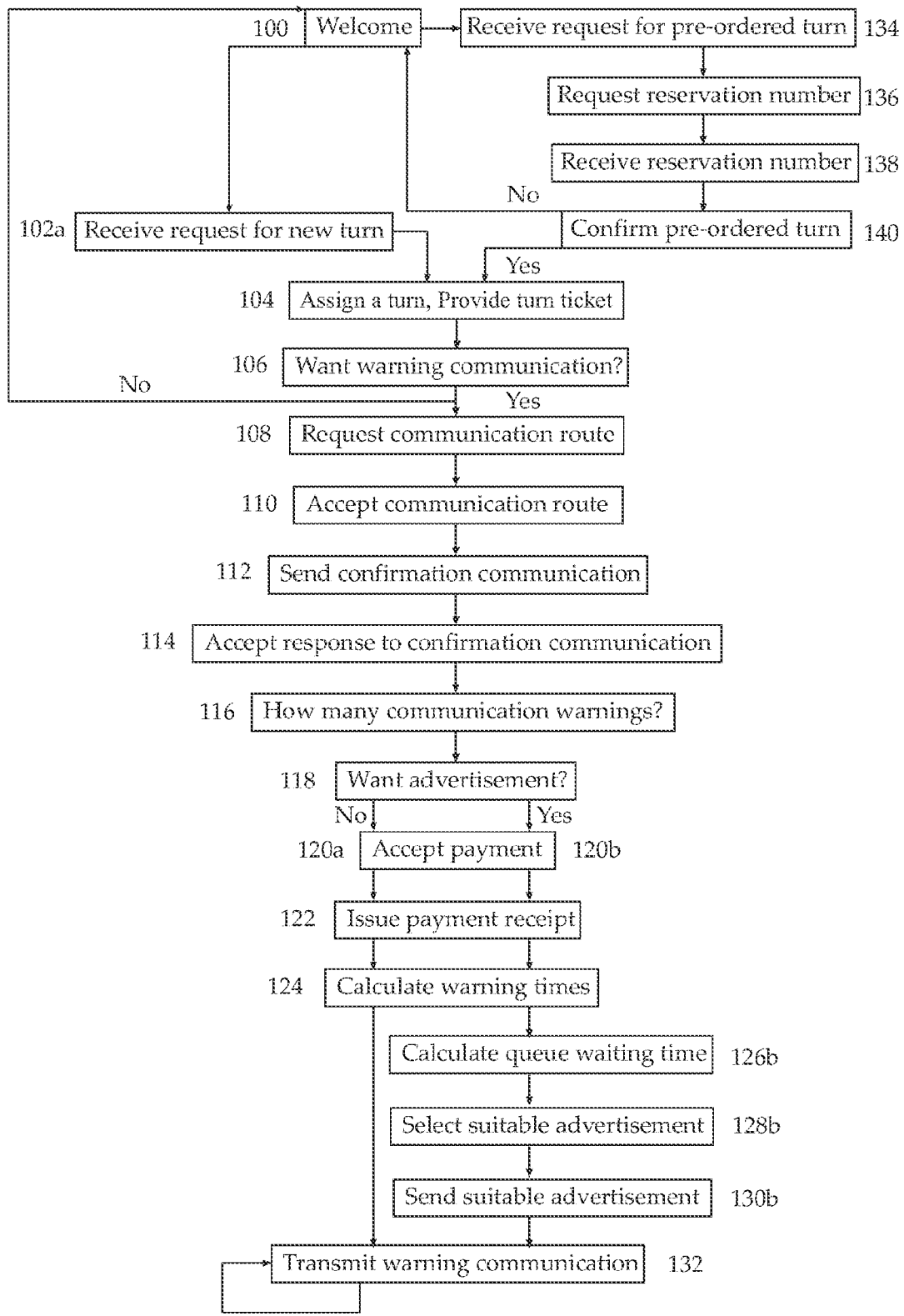
FIG. 4B is a flow-chart describing an exemplary embodiment of the method of queue management described herein.

If the person has not pre-ordered a turn, the person selects the choice "I want to see a doctor" and the request is received by processor 20 and continues as described above with reference to FIG. 1, starting with 102a in FIG. 4B. The person is assigned a turn in the queue and proceeds substantially as described above, 104 to 106 in FIG. 4B (if no warning communications are desired) or 104 to 132 in FIG. 4B (if warning communications are desired). The person is assigned a turn in the queue (104 in FIG. 4B) according to a policy decided upon by the queue operator. For example, in some embodiments a person who has not pre-ordered a turn is assigned a turn at the end of the queue. For example, in some embodiments, a person who has not pre-ordered a turn is assigned a turn between two people who have pre-ordered a turn. In some embodiments, after the person has finished at turn-distributing terminal 18 (e.g., 106 or 122 in FIG. 4B), the person may be required to use at least some of the queue waiting time providing preparatory information, for example through turn-distributing terminal 18 or to a medical secretary, for example in reception area 16.

If the person has pre-ordered a turn, the person selects the choice "I have already reserved a turn" through turn-distributing terminal 18. Controller 20 receives the request for the pre-ordered turn from turn-distributing terminal 18, 134 in FIG. 4B.

Controller 20 uses turn-distributing terminal 18 to request confirmation that the person indeed has pre-ordered a turn "Please input your reservation number", 136 in FIG. 4B.

In response, the person uses the touch screen of turn-distributing terminal 18 to enter a reservation number received when ordering the pre-ordered turn.

Controller 20 receives the entered reservation number from turn-distributing terminal 18, 138 in FIG. 4B.

Controller 20 compares the entered reservation number to a list of pre-ordered turns (not depicted) maintained in controller 20 to confirm that the pre-ordered turn exists, 140 in FIG. 4B.

If the reservation number does not exist in the list of pre-ordered turns, controller 20 displays the welcome screen using the touch screen of turn-distributing terminal 18, 100 in FIG. 4B.

If the reservation number exists and the person's turn in the queue has not yet arrived, controller 20 assigned the person the pre-ordered turn and continues substantially as described above, 104 to 106 in FIG. 4B (if no warning communications are desired) or 104 to 132 in FIG. 4B (if warning communications are desired).

If the reservation number exists and the person's turn in the queue has already passed, the person is treated like a person who has not pre-ordered a turn in the queue, substantially as described above.

In some of the embodiments described above, there is only one turn-distributing terminal positioned in a waiting area. In some embodiments, two or more turn-distributing terminals positioned in a waiting area (e.g., as discussed with reference to FIG. 2). In some embodiments, the turn-distributing terminals are all positioned in proximity one to the other. In some embodiments, the turn-distributing terminals are distant one from the other, for example, a service is provided by a pharmacy in a shopping mall that is the waiting area, and there is a turn-distributing terminal positioned at two or more different locations (e.g., different entrances) of the waiting area.

In some of the embodiments described above, there is only one waiting area where at least one turn-distributing terminal is positioned. In some embodiments, there are two or more waiting areas (e.g., as discussed with reference to FIG. 3), where there is at least one turn-distributing terminals positioned in each waiting area. Such embodiments are generally implemented when the person waiting in the queue is able to travel in a vehicle, for example in embodiments for cargo-container depot queue management.

In some of the embodiments discussed above, advertisements are all sent at one time at the beginning of a person's wait in the queue, allowing the person to rationally plan how to spend the queue waiting time. In some embodiments, advertisements are sent at other times during the queue waiting time. In some such embodiments, a queue management controller such as 20 records which of the persons who is eligible to receive advertisements, for example in a database 206.

Generally, the mode of transmission of warning communications is such as to reach a person remote from the service location (e.g., not in the service location or in a reception area of the service location, in some embodiments at least about 2 meter from the service location or from a reception area of the service location and in some embodiments in some embodiments at least about 5 meter from the service location or from a reception area of the service location). Such a feature allows the person to be distant from the service location and/or reception area, giving the person freedom to use the queue waiting time.

In some embodiments, the mode by which advertisements are sent is configured to reach a person remote from the service location (e.g., not in the service location or in a reception area of the service location, in some embodiments at least about 2 meter from the service location or from a reception area of the service location and in some embodiments in some embodiments at least about 5 meter from the service location or from a reception area of the service location). Such a feature allows the person to be distant from the service location and/or reception area, giving the person maximal access to useful advertisements.

In the embodiments discussed above, a person assigned a turn in a queue is also provided with a turn-ticket, for example a physical turn-ticket (e.g., a printed paper ticket) or a virtual turn-ticket (e.g., an SMS designating the turn). In some embodiments, a turn-ticket is not provided.

In the embodiments discussed above, the communication route described is a cellular telephone number and communications with the person are performed with the help of text messages (e.g., SMS). In some embodiments, additional or alternative suitable communication routes are used, for example electronic mail, electronic mail through the Internet, or messages on a dedicated Internet web site, for example accessible using a mobile communication device. In some embodiments, in addition to or alternatively to text messages, other types of suitable communication modes are used, for example, voice messages, audible signals, graphic messages (descriptive images) and the like.

In some embodiments described above, communication to a communication route is with a communication device that constitutes the Internet, using a suitable website and associated hardware that allows transmission of communications to a mobile communication device of a person such as a cellular telephone using a cellular telephone network. In some embodiments, other communications devices are used, for example, WiFi Networks, Bluetooth networks and the like.

In some embodiments discussed above, a confirmation communication that includes a number is sent. As noted above, in some embodiments, other types of confirmation communications are sent, such as communications including images or audible information, especially when there is fear that a person may abuse the queue management method and send a surrogate to be present at the waiting area to request a turn. For example, in some embodiments, an image is sent as a confirmation communication to the communication route and a valid response to the confirmation communication is to select an image from amongst a number of images displayed at the turn-distributing terminal in a limited time. For example, in some embodiments, an audible voice message is sent as a confirmation communication to the communication route and a valid response to the confirmation communication is to follow the instructions given in the voice message to select a valid response amongst a number of responses displayed at the turn-distributing terminal in a limited time.

As noted above, in some embodiments receipt of at least one warning communications is contingent on agreement to pay for at least one warning communications. In some embodiments receipt of at least one warning communications does not require payment.

As noted above, in some embodiments sending an advertisement to a person is contingent on receipt of consent therefore. In some embodiments, agreement to receive advertisements is explicit: the person accepts or rejects an offer that advertisements be sent. In some embodiments, agreement to receive advertisements is implicit in requesting at least one warning communications. In some embodiments, a person is not asked whether or not advertisements are to be sent.

As is understood from the above, whereas many methods of queue management known in the art are directed at managing a queue for the convenience of a service location, embodiments of the methods described herein are also directed at increasing the convenience of a person who comes to a service location to receive a service, including by providing the person a more convenient and pleasurable wait, allowing a person to make efficient use of waiting time, and providing the person with useful and focused advertisements.

Embodiments of the method and devices described herein are easily implemented by a person having ordinary skill in the art without undue experimentation upon perusal of the description and figures herein. Some embodiments may be easily implemented by modification of existing queue management devices (including queue management controllers, turn-distributing terminals, counter terminals and display boards) such as commercially available from Q-Matic Corporation (Fletcher, N.C., USA), Shenzen AOTO Electronics CO., Ltd. (Shiyan, Shenzen, China), QMS Akis (Vilnius, Lithuania), GMS Sdn Bhd (Selangor, Malaysia) and Lonsto Ltd (Southgate, London, UK). Selecting advertisements from a set of advertisements to send to a person based on one or more characteristics of the person may be implemented using any known methods and devices, for example, commercially available methods and devices as implemented by Google, Mountain View, Calif., USA. Control of a database including selecting and updating records, for example a list of advertisements such as 208 or a list of persons 206 is easily implemented by a person skilled in the art of data bases, using commercially available database software (e.g., Microsoft Office Access by Microsoft®, Redmond, Wash., USA or OpenOffice.org Base, Sun Microsystems, Santa Clara, Calif., USA) in consultation with instructions, help files and tutorial programs available with such database programs.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A method for queue management for a service provided at a service location, comprising:
   a. positioning at least one turn-distributing terminal at a waiting area;
   b. upon request by a person for a turn from a said turn-distributing terminal, assigning the person a turn in a queue;
   c. allowing the person to select whether or not to receive at least one warning communication warning of the approach of said turn;
   d. subsequent to c, if the person selects to receive said at least one warning communication, accepting a communication route of the person in said waiting area, subsequent to said accepting said communication route, sending the person at least one advertisement wherein the nature of said advertisement is related to a waiting time for said turn; and
   e. subsequent to d and prior to said turn, if the person selects to receive said warning communication, transmitting to said person at least one said warning communication.

2. The method of claim 1, wherein said transmitting of said at least one warning communication is contingent on agreement to pay for at least one said warning communication.

3. The method of claim 1, wherein said accepting said communication route of the person is through said turn-distributing terminal.

4. The method of claim 3, wherein said communication route is a contact number of a mobile communication device.

5. The method of claim 1, wherein said transmitting of at least one said warning communication is contingent on receipt of a valid response to a confirmation communication transmitted through said communication route.

6. The method of claim 5, wherein said transmitting of said at least one warning communication is contingent on receipt of a response to said confirmation communication through said turn-distributing terminal.

7. The method of claim 1, further comprising accepting a desired number of said warning communications from said person, wherein the person has the option of selecting zero warning communications.

8. The method of claim 1, wherein at least one said warning communication is transmitted to said communication route.

9. The method of claim 1, wherein said sending of said at least one advertisement is contingent on receipt of consent therefore.

10. The method of claim , wherein said transmitting of said at least one warning communication is contingent on agreement to receive said advertisement.

11. The method of claim 1, wherein said advertisement is sent through said communication route.

12. The method of claim 1, wherein said advertisement is for a service available in proximity of said waiting area.

13. The method of claim 1, wherein said advertisement is for a service available in proximity of a route between said turn-distributing terminal and said service location.

14. The method of claim 1, wherein the nature of said advertisement is related to the nature of the service.

15. The method of claim 1, wherein the nature of said advertisement is related to the nature of the person.

16. The method of claim 1, wherein the nature of said advertisement is related to a choice made by the person.

17. A queue management device configured to manage a queue, comprising a controller functionally associated with at least one turn-distributing terminal configured for positioning in a waiting area of a service location, together configured to:
   a. assign a turn in a queue to a person located in said waiting area and requesting such;
   b. accepting a communication route from a said person and storing said communication route in association with a said assigned turn in the queue; and
   c. accepting from a said person a selection as to whether or not the person wishes to receive at least one warning communication,
   wherein the device is functionally associated with a communications component, and
   d. prior to a said turn of a said person, if the person selected to receive said at least one warning communication, transmitting a warning communication to said person using said communications component wherein the device is further configured to send an advertisement to a said communication route of a person using said communications component; further comprising a collection of different advertisements, the device configured to select an advertisement from said collection of different advertisements based on characteristics of said advertisement and to send said selected advertisement, and configured to calculate a queue waiting time, and wherein said selection is based on said queue waiting time.

18. The device of claim 17, configured such that said accepting of a communication route is through a said turn-distributing terminal.

19. The device of claim 17, configured such that said assigning a said turn in said queue is through a said turn-distributing terminal.

20. The device of claim 17, further comprising a payment accepting component.

21. The device of claim 17, further configured to transmit a said warning communication to a said stored communication route of a person using said communications component.

22. The device of claim 17, further configured to transmit a confirmation communication to a said stored communication route of a person using said communications component.

23. The device of claim 22, further configured to receive a response to a transmitted said confirmation communication through a said turn-distributing terminal.

* * * * *